Figure 1:
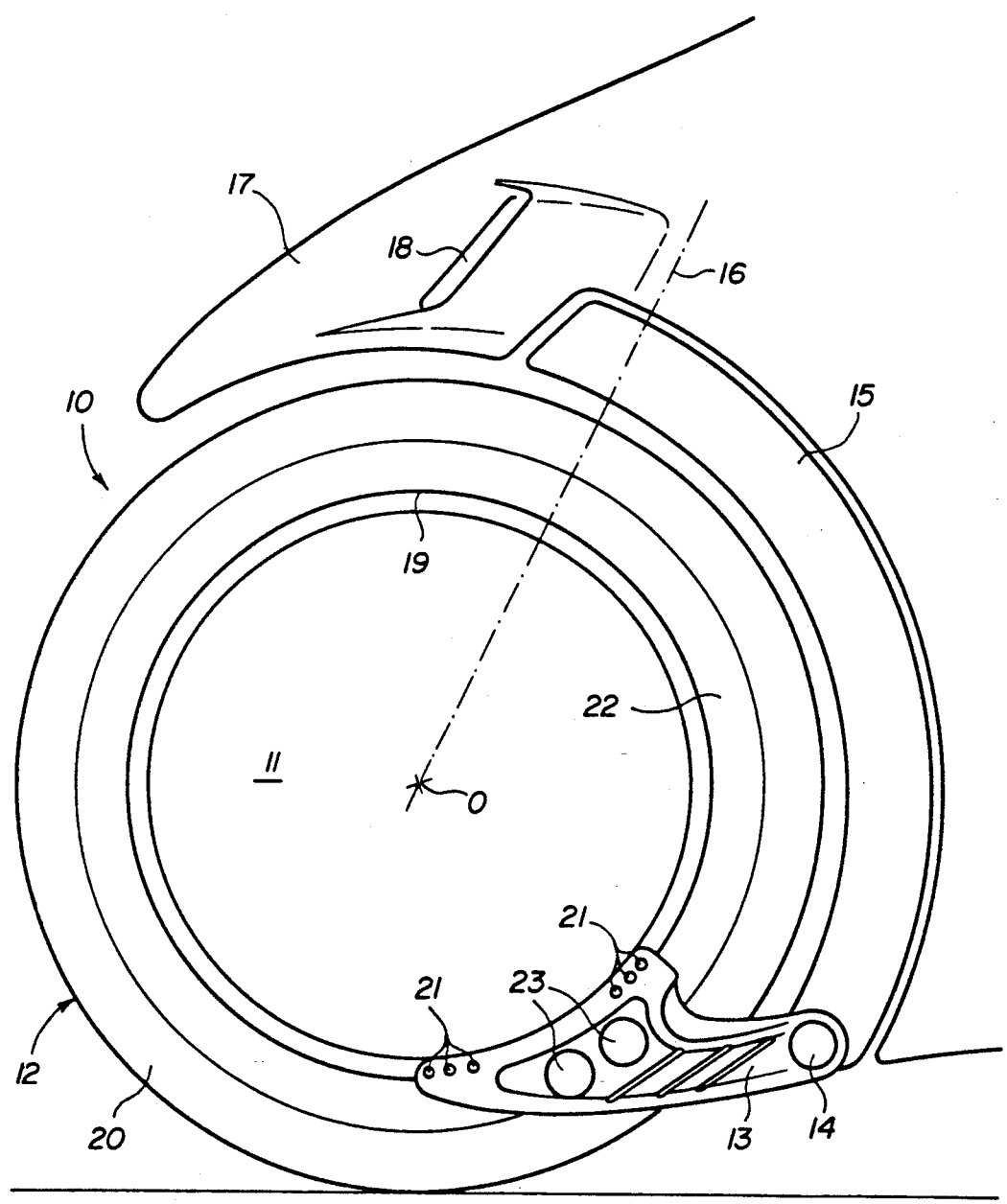

United States Patent [19]

Sbarro

[11] Patent Number: 5,071,196
[45] Date of Patent: Dec. 10, 1991

[54] WHEEL FOR A MOTOR VEHICLE OR TOWED VEHICLE AND A VEHICLE FITTED WITH SUCH A WHEEL

[75] Inventor: Franco Sbarro, Les Tuileries-de-Grandson, Switzerland

[73] Assignee: SM Sbarro Mottas Engineering S.A., Switzerland

[21] Appl. No.: 490,561

[22] PCT Filed: Jul. 7, 1989

[86] PCT No.: PCT/CH89/00130
§ 371 Date: Mar. 9, 1990
§ 102(e) Date: Mar. 9, 1990

[87] PCT Pub. No.: WO90/00477
PCT Pub. Date: Jan. 25, 1990

[30] Foreign Application Priority Data

Jul. 11, 1988 [FR] France .................. 88 09627

[51] Int. Cl.[5] .............................. B60B 19/00
[52] U.S. Cl. ........................ 301/5 R; 301/1; 305/7
[58] Field of Search ............... 301/1, 5 R, 111, 63 R; 305/6, 7; 16/18 R, 45, 30, 46

[56] References Cited

U.S. PATENT DOCUMENTS

| | | | |
|---|---|---|---|
| 2,843,426 | 7/1958 | Nojima | 301/5 R |
| 3,329,444 | 7/1967 | Lidov | 305/7 X |
| 4,011,919 | 3/1977 | Groeger | 305/6 X |
| 4,045,096 | 8/1977 | Lidov | |
| 4,465,321 | 8/1984 | Berg | 305/7 X |
| 4,735,459 | 4/1988 | Massonnit | 301/1 |

FOREIGN PATENT DOCUMENTS

| | | |
|---|---|---|
| 3408874A1 | 9/1985 | Fed. Rep. of Germany . |
| 129867 | 8/1919 | United Kingdom . |
| 1148021 | 11/1967 | United Kingdom . |

Primary Examiner—Russell D. Stormer
Attorney, Agent, or Firm—Davis, Bujold & Streck

[57] ABSTRACT

A wheel (10) designed to travel on a given support surface comprises a central part (11) and a peripheral part (12) concentric to the central part. The two parts are coupled by a bearing (19) comprising an inner annular element integral with the central part and an outer annular element integral with the peripheral part. The peripheral part comprises a contact element (20) in contact with the support surface and the central part is connected to the basic structure (15) of the vehicle at a decentralized point of attachment (21). The outer part of the bearing (19) comprises a braking ring (22) which co-operates with braking jaws (23) mounted on an arm (13) connected by a swivelling axis (14) to the basic structure (15). The wheel is particularly suitable for passenger cars, motorcycles, trailers, etc.

12 Claims, 3 Drawing Sheets

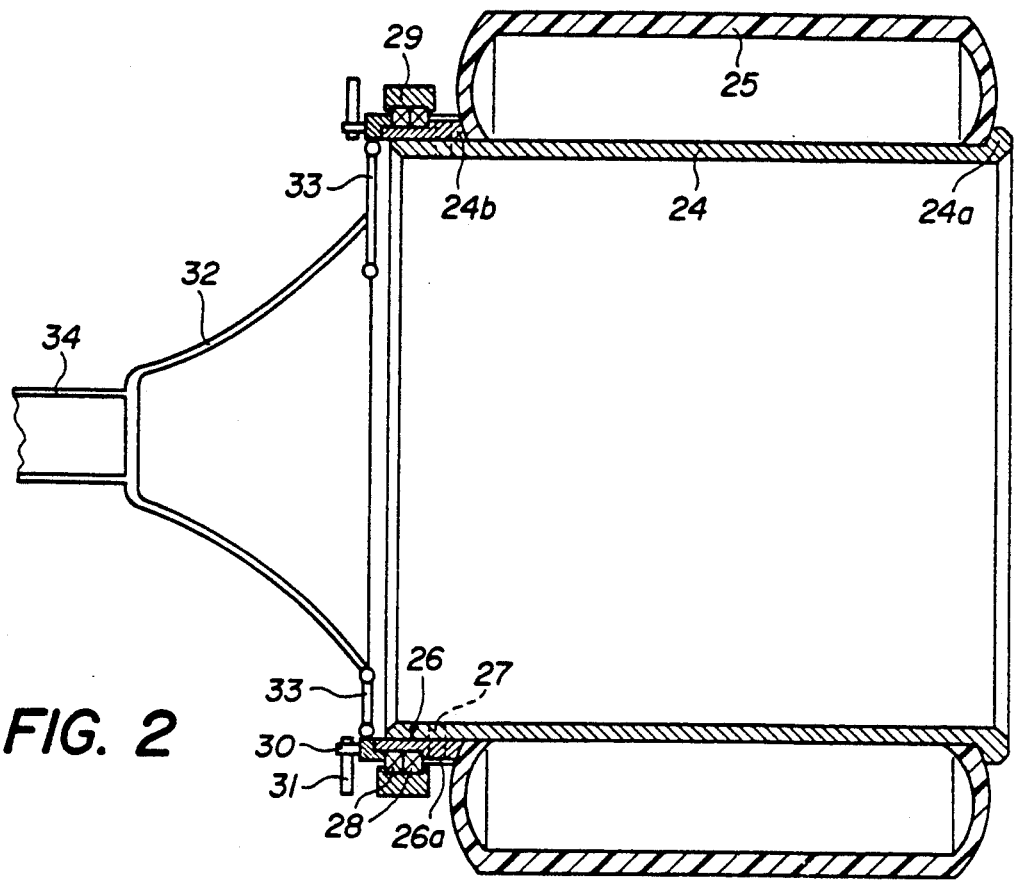
FIG. 2
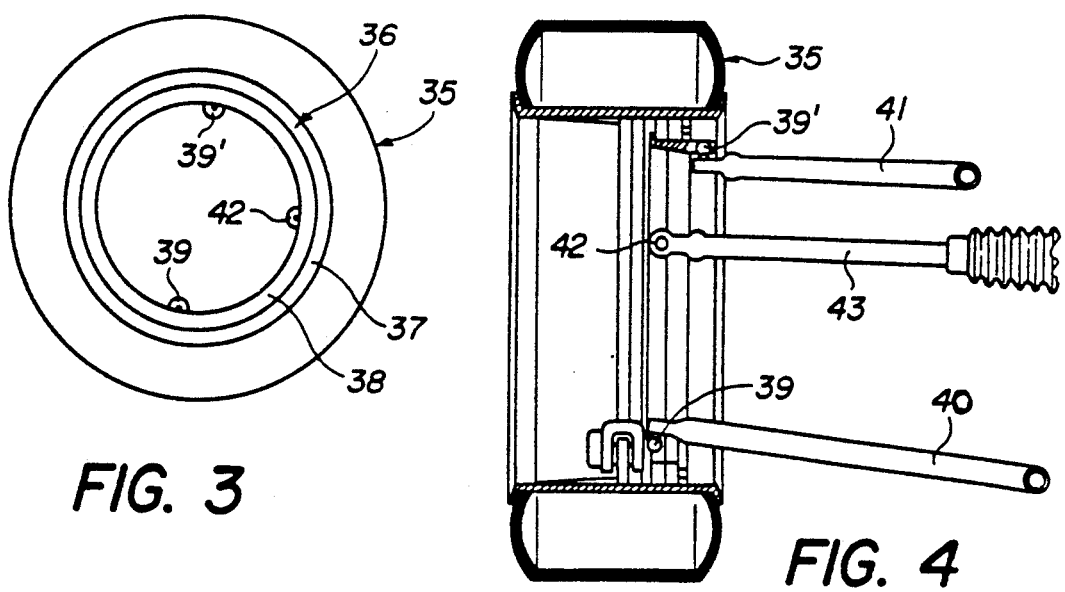
FIG. 3
FIG. 4

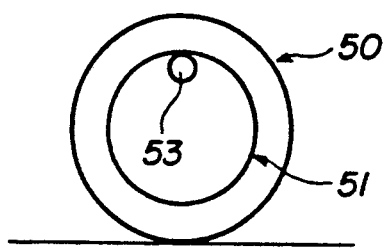
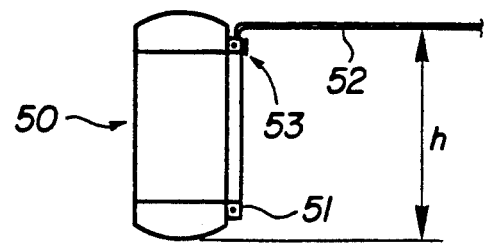
FIG. 5A                    FIG. 5B
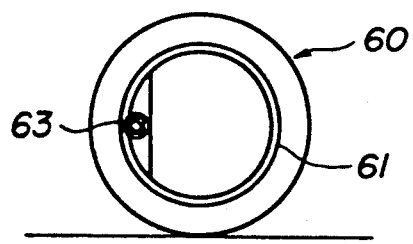
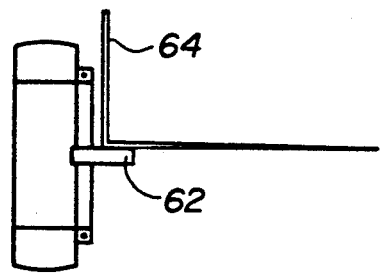
FIG. 6A                    FIG. 6B
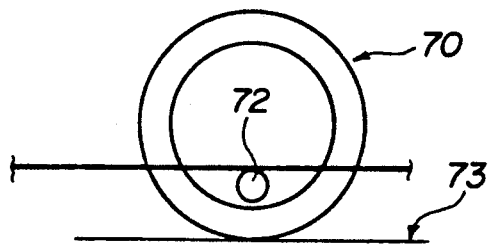
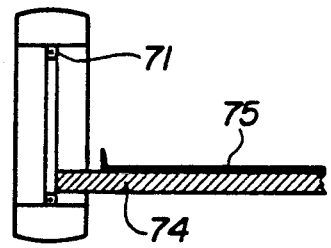
FIG. 7A                    FIG. 7B
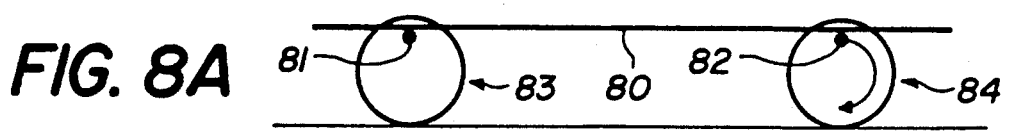
FIG. 8A
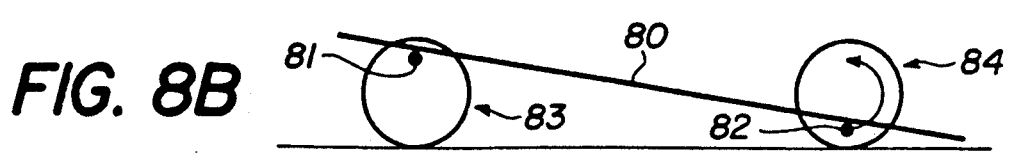
FIG. 8B

WHEEL FOR A MOTOR VEHICLE OR TOWED VEHICLE AND A VEHICLE FITTED WITH SUCH A WHEEL

The present invention relates to a motor vehicle or a towed vehicle, designed to travel on a given support surface, comprising a central part connected to the basic structure of the vehicle and a peripheral part concentric with respect to said central part and designed to rotate around the latter, in which said central part and said peripheral part are coupled by at least one bearing comprising at least one inner annular element integral with said central part and at least one outer annular element, concentric to said inner annular element and integral with said peripheral part, the latter bearing a contact element corresponding to the nature of the support surface of the vehicle.

It also relates to a motor vehicle or towed vehicle fitted with such wheels.

The wheels of most present-day vehicles, and more particularly road vehicles such as private cars, motorcycles, heavy lorries, trailers, etc, or vehicles on rails such as certain trains, especially high-speed trains, are of the hub type. The hub, which normally has a much smaller diameter than the wheel, comprises a central part integral with the basic structure of the vehicle and a peripheral part concentric to said central part, and designed to rotate around the latter.

In the case of a road vehicle, the wheel comprises a rim bearing a tire and a lateral flange fitted with attachment means, such as, for example, bolts permitting the wheel to become integral with the corresponding hub. In the case of certain vehicles on rails, the wheel comprises a profiled annular belt having a support surface adapted to the rail, and a flange enabling the wheel to be fixed to the hub.

The starting forces and also the braking forces are always transmitted across the hub, i.e. at points relatively far from the contact points of the contact element of the wheel with the support surface of the vehicle. In the case of an automobile vehicle, drive occurs through the hub, which transmits the movement through the rim to the tire, the goal sought after being the relative displacement of the contact surface of the tire with respect to the road surface. Similarly, when braking, the forces, which in the last resort must result in a reduction in the relative displacement of the contact surface of the tire with respect to the road surface, are applied onto a disk or friction surface connected to the hub and transmitted by means of the rim to the terminal point. This transmission of forces brings into play great leverage, which requires very robust, relatively heavy and often overdimensioned structures for safety reasons.

From the kinematic viewpoint, this type of construction has very many drawbacks. The consequences of this are manifold and the solutions which have been adopted to resolve problems of suspension, road holding, braking and power transmission have become more and more sophisticated whilst, nevertheless, remaining compromise solutions. Because of the weight of the wheel hubs and the components which are attached thereto, the inertia to be corrected by the suspension and by the shock absorbers is large, which results in very negative consequences for the road-holding of the vehicle. In practice, the contact element, which is normally a tire, at least for road vehicles, is even more difficult to keep in contact with the support surfaces because the non-suspended masses are large. If the contact of the tire with the road surface is poor, the road-holding of the vehicle is poor and it becomes dangerous to drive it, in particular on an irregular road surface.

Different approaches have been used in an attempt to resolve these problems. German Patent Application no. DE 34 08 874 A1 describes a wheel having a bearing with a large diameter and theoretically not having a hub. However the inner part of this wheel has a diametrical support element, the two ends of which form attachment points for this wheel. In practice, the existence of this support is equivalent to an increase in the dimensions of the hub, especially if this support is used for mounting a telescopic suspension arm. This wheel is not suitable for a two-wheeled vehicle, and in particular it is not suitable as the front steering wheel of a motorcycle. Finally the interior of the wheel is not free and does not permit the mounting of components or operating parts of the vehicle.

The object of the present invention is to remove these various drawbacks by constructing a wheel as mentioned in the preamble, which enables the leverage to be considerably reduced for the transmission of driving and braking forces, the articulation points for the suspension of the vehicle to be positioned at places considerably closer to the support surface of the vehicle, and to lighten the means for coupling to the basic structure of the vehicle by a high factor. Furthermore, this concept enables the interior of the wheel to be completely empty for use for positioning components, operating parts or accessories for the vehicle. Finally, this wheel as specified by the invention may be adapted equally to the front or rear of a two-wheeled or four-wheeled road vehicle, to construction site vehicles or to vehicles on rails.

This object is achieved by the wheel as specified by the invention, characterised in that said central part is connected by at least one suspension arm to the basic structure of the vehicle, at at least one peripheral attachment zone of the wheel, this zone being situated near the support surface, in the lower part of the wheel, in that the bearing is water-tight and rigid, and in that the central part of the bearing is empty and does not have any diametrical reinforcement structure.

According to a particularly advantageous embodiment, the inner annular element of the bearing comprises attachment components to couple this wheel to the basic structure of the vehicle.

According to an advantageous embodiment for a four wheeled vehicle, the inner annular element of the bearing comprises hinged attachment components to couple the wheel to the basic structure of the vehicle by means of two suspension arms, one of which is hinged to the lowest point of said inner annular element and the other of which is hinged to the highest point of this element.

According to another advantageous embodiment for a two wheeled vehicle, the inner annular element of the bearing comprises hinged attachment components to couple the wheel to the basic structure of the vehicle, by means of a single suspension arm hinged near the lowest point of said inner annular element.

According to an embodiment in which the wheel is intended for use as a steering wheel, it comprises means to couple said inner annular element to at least one steering column of the vehicle.

According to an advantageous embodiment of the wheel, the outer annular element of the bearing is connected to components for coupling this wheel to the vehicle's drive means.

For a four-wheeled vehicle, said components may comprise a structure in the shape of a truncated cone attached to the outer annular element by means of a small hinged rod.

The structure in the shape of a truncated cone is advantageously made from a light-weight composite material.

According to another embodiment, said components for coupling this wheel to the vehicle's drive means comprise a sprocket designed to receive a chain or to engage a drive gear.

According to a particularly advantageous embodiment, the outer annular element of the bearing bears an annular part comprising two substantially flat faces forming a braking ring and the inner annular element of the bearing bears at least one braking jaw designed to cooperate with said ring.

This inner annular element may be joined to a tubular support and the interior space of this tubular support may contain the vehicle's operating components and accessories.

The present invention will be better understood with reference to the description of the embodiments and of the attached drawings in which:

FIG. 1 represents an elevated view of a particular embodiment of a wheel according to the invention comprising, for example, the front wheel which is the steering wheel of a two-wheeled vehicle, FIG. 2 represents a diametrical cross section of a specific embodiment of a drive wheel of a four-wheeled road vehicle, FIGS. 3 and 4 represent a view of a specific embodiment of a steering wheel of a four-wheeled road vehicle, FIGS. 5A and 5B represent diagrammatic front and side views, respectively, illustrating an embodiment of the invention for providing high ground clearance, FIGS. 6A and 6B represent diagrammatic front and side views, respectively, of a second embodiment of the invention for interconnecting the wheel with a transverse axle, FIG. 7A and 7B represent diagrammatic front and side views, respectively, of a third embodiment of the invention for trailers carrying heavy loads, and FIGS. 8A and 8B represent diagrammatic front views of a fast-loading trailer in a raised and a lowered position, respectively, illustrating a further use of the present invention.

With reference to FIG. 1, the wheel 10 shown essentially comprises a central part 11 and a peripheral part 12 which is concentric to the central part 11. The central part 11 is made integral with the basic structure of the vehicle, for example by an arm 13 mounted on a swivel axis 14 fixed to an element 15 of the chassis or directly to a support of the motor of the two- wheeled vehicle. This element 15 is integral with a fork, the theoretical axis of which is represented by the line 16 which passes through the imaginary center O of the wheel 10. A fairing 17 bearing a headlight 18 is shown diagrammatically, The central part 11 and the peripheral part 12 are coupled by a bearing 19 which comprises an inner annular element and an outer annular element which are integral with one another in a per se known way by means of balls, cones or needles. The bearing 19 is in fact a standard bearing, of large size, which is characterised by being perfectly water-tight and resistant to relatively high stresses to which it may be subject in use on a road vehicle, rail vehicle or cross-country vehicle. This type of bearing comprises one or several ball rings separated from one another so as to avoid their touching and thus being subject to heating and wear.

As the vehicle for which the wheel shown in FIG. 1 is intended is a road vehicle, this wheel comprises a contact element 20 which is in fact a tire mounted on a rim (not shown), and integral with the outer element of the bearing. The inner element of the bearing, which has a tubular shape or may be joined to a tubular support element, is fixed by conventional means, e.g. by bolts 21 to the arm 13. For this purpose the inner element of the bearing advantageously comprises lugs on which the bolts 21 are fixed.

A single lug disposed in the lowest zone of the wheel is sufficient to hold said wheel. The advantage of this method of attachment, specified for high-performance road vehicles, such as automobiles, motor cycles, heavy lorries, etc, is that the wheel is held in a zone which is situated as close as possible to the support surface. In this way all leverage is avoided because of the redirection of the forces and stresses to the hub as is mandatory on classical wheels. The outer part of the bearing also supports a braking ring 22, which has a large diameter and a relatively small width, and which collaborates with braking jaws 23 mounted on arm 13. Thanks to this geometry, the braking operation is performed in a zone very close to the road surface and its efficiency is even greater because the braking forces are directly transmitted to the wheel, in the zone which is immediately adjacent to the contact point between the tire and the road surface, and because the surface of the ring is large because of its large diameter.

The wheel shown by FIG. 2 is an automobile drive wheel. It comprises a rim 24 bearing a tire 25 clamped between two lateral flanges 24a and 24b. Lateral flange 24b is integral with an annular support 26 fixed to the rim by means of bolts 27, and which is made integral with the outer annular element of a bearing 28. The inner annular element (non-rotating) of the bearing 28 is made integral with an element 29 of the chassis of the vehicle (not shown). Classical attachment means, such as bolts 30, hold a braking ring 31, which is substantially identical to ring 22 described with reference to FIG. 1.

The annular support 26 may also bear a sprocket 26a designed to cooperate with a chain coupled to a drive gear (not shown).

The drive of the wheel, which due to the spectral construction of this wheel has to be transmitted to the outer element of the bearing 28, may be constructed in the shape of a truncated cone 32, and made from a particularly light-weight composite material, such as carbon fibres, for example, and coupled to said outer element by three small rods 33. A drive axle 34, coupled to said element 32, is connected in a conventional manner to the transmission members of the vehicle. The small rods are hinged at their two ends, on the rim and on the part shape like a truncated cone respectively.

FIGS. 3 and 4 show another embodiment of a steering wheel 35 of a road vehicle. As above, this wheel has a bearing 36 comprising an outer part 37 and an inner part 38. The inner part 38 of the bearing 36 is fixed to the basic structure of the vehicle at at least one point 39. To use this wheel on vehicles comprising two per se known classical suspension arms 40 and 41, the inner part 38 of the bearing may have two attachment points 39 and 39'. A third attachment point 42, also provided on the inner element 38 of the bearing 36, enables a per se known steering column 43 to be coupled.

It will be noted that, in contrast to the classical system in which the three attachment points are provided on the hub, i.e. distributed over a relatively small perimeter, the three attachment points 39, 39' and 42 of the wheel shown by FIGS. 3 and 4 are relatively far apart, and this factor considerably increases their effectiveness and enables stresses to be considerably reduced, both at the steering level and at the suspension level, and consequently enables the weight of the parts used to be reduced and the effectiveness of the components to be increased. One particular consequence is that it is possible to steer the vehicle with extreme precision. Another advantage of the system is attributed to the fact that the center of the wheel is totally free to house various components such as exhaust silencers, etc. for example. Furthermore, from the aesthetic and aerodynamic viewpoint, the wheel may be streamlined.

For vehicles having a particular use, such as cross country vehicles where as great as possible ground clearance is much more important than road performance, the wheel specified by the invention also has totally unique advantages. Certain vineyard tractors have to have very great ground clearance so that the wine grower can pass over the vine plants. The wheel specified by the invention enables such vehicles to be constructed in a simple and economical way. In this case it is enough to provide an anchor point for the wheel in a decentralised zone which is as high as possible. Such a design is illustrated by FIGS. 5A and 5B. As above, the wheel 50 has a bearing 51. The rotating outer annular element of the bearing is integral with the rim. The fixed inner annular element of the bearing is made integral with a suspension arm 52 at an off-center point 53 which is situated in the highest zone of the central part of the wheel, i.e. the furthest from the support surface. As a result there is a ground clearance h which is very near to the diameter of the wheel.

For trailers with suspension integrated into the wheel, which traditionally comprise a transversal axle bearing at each end an arm connected to the hub of a wheel, the wheel as specified by the invention, shown by FIGS. 6A and 6B, enables a simple and efficient construction. The wheel 60, which comprises a bearing 61, is fixed to a cross-drive shaft 62 or a pivot by means of a torsion-friction type resilient connection which forms a suspension 63. The attachment point is made in an off-center zone situated half way up the wheel. From the suspension viewpoint, this system is equivalent to a classical system having a suspension arm connecting the hub. The platform or carcass 64 of the trailer may be directly fixed to the pivot 62.

For trailers carrying heavy loads there may be provided, as shown by FIGS. 7A and 7B, a wheel 70 having at least one bearing 71 in which the outer annular element bears the rim and in which the inner annular element is provided with an attachment point 72, disposed at a point as near as possible to the support surface 73. A chassis 74, supporting a platform 75, for example, is directly fixed to the off-centre attachment point 72.

A refinement of these various means of attachment is illustrated by FIGS. 8A and 8B. To construct a fast-loading breakdown vehicle, for example, a platform 80 may be mounted in two off-center zones 81 and 82 of two wheels 83 and 84 having bearings as described above. For road use, the two attachment points 81 and 82 are in the high position. When attachment point 82 of wheel 84 is lowered, by appropriate means, into a low position, the platform 80 becomes a fast-loading ramp which is particularly suited to broken-down vehicles. To perform this operation there must be a device which is integral with the chassis of the trailer which enables the inner annular element of the bearing to rotate by 180° around a central axis (not shown).

In addition to these advantages, the fact, mentioned above, that the central part of the wheel, which is of a tubular construction, provides an available space for the positioning of components which, until now, had to be housed outside the wheel, is of considerable advantage. In particular, the interior of the rear wheel of a motor cycle may be used to house the exhaust silencer. The toe-clips for the rear passenger may be directly fixed onto the inner element of the bearing. This space could also be used to house other components such as the petrol tank, the gear box, etc., for example. This may produce a completely new geometry of the vehicles. Particular advantages result from this, notably the considerable lowering of the center of gravity, which gives this type of vehicle great stability and good road-holding, and consequently a level of safety never achieved before.

Although the figures only show wheels corresponding to road vehicles, it is understood that this type of wheel may also be used for rail vehicles. In this case, the tires may be replaced by suitably profiled annular parts so that they adapt to the profile of the rails.

The existence of a non-rotating tubular central part also considerably facilitates the coupling of two or more wheels, which may be relatively beneficial for special vehicles intended to travel in marshy or particularly wet terrains, or for military vehicles.

The present invention is not restricted to the embodiments described, but may be subject to various modifications and may undergo various refinements obvious to a person skilled in the art. The fundamental characteristic lies in coupling the inner part to the outer part of the wheel by a large bearing, with this wheel behaving like a rigid caterpillar. The consequences are essentially attributed to the fact that the central part of the wheel is hollow which enables important technical and aesthetic innovations to be implemented.

I claim:

1. A wheel for a vehicle designed to travel on a desired support surface, comprising a central part connected to the basic structure of the vehicle and a peripheral part concentric with respect to said central part and rotatable therearound, in which said central part (11) and said peripheral part (12) are coupled to one another by at least one annular bearing (19) disposed therebetween, the at least one annular bearing (19) comprising at least one inner annular element integral with said central part, at least one outer annular element concentric with said inner annular element and integral with said peripheral part, and bearing members extending completely around the circumference of the annular bearing and located between said concentric inner and outer annular elements, said peripheral part (12) supporting a contact element (20) for engaging the support surface, characterised in that said central part (11) is connected by at least one suspension arm to the basic structure of the vehicle at at least one peripheral attachment zone (21) of the wheel, this zone being situated adjacent the support surface, in the lower part of the wheel, in that the annular bearing is water-tight and rigid, and in that said central part (11) of this bearing is empty and does not have any diametrical reinforcing structure.

2. A wheel as specified in claim 1, characterised in that the inner annular element of the bearing (28) comprises hinged attachment components (30, 39, 39') to couple the wheel to the basic structure (29) of the vehicle by means of at least one suspension arm (40, 41).

3. A wheel as specified in claim 2, for a vehicle having two wheels,
characterised in that the inner annular element of the bearing (28) comprises hinged attached components (39) to couple the wheel to the basic structure (29) of the vehicle by means of a single suspension arm (40) hinged adjacent the lowest point of said inner annular element.

4. A wheel as specified in claim 1, for a vehicle having four wheels,
characterised in that the inner annular element of the bearing (28) comprises hinged attachment components (39, 39') to couple the wheel to the basic structure (29) of the vehicle by means of two suspension arms (40, 41), one of which is hinged to the lowest part of said inner annular element and the other of which is hinged to the highest part of said inner annular element.

5. A wheel as specified in claim 4, for use as a steering wheel,
characterised in that the attachmen further comprises means (42) to couple said inner annular element to at least one steering column of the vehicle (43).

6. A wheel as specified in claim 1, characterised in that the outer annular element (37) of the bearing (36) is connected to components for coupling this wheel to drive means for driving the vehicle.

7. A wheel as specified in claim 6, characterised in that said components for coupling this wheel to the vehicle's drive means comprise a sprocket (26a) engagable with one of a chain and a drive gear to drive the vehicle.

8. A wheel as specified in claim 1, characterised in that the outer annular element of the annular bearing supports an annular part comprising two substantially flat faces forming a braking ring (22) and the inner annular element of the annular bearing supports at least one braking jaw (23) arranged to cooperate with said ring.

9. A wheel as specified in claim 1, characterised in that the inner annular element is connected to a support for containing operating components of the vehicle.

10. A wheel for a vehicle having four wheels designed to travel on a desired support surface, comprising a central part connected to the basic structure of the vehicle and a peripheral part concentric with respect to said central part and rotatable therearound, in which said central part (11) and said peripheral part (12) are coupled to one another by at least one annular bearing (19) disposed therebetween, the at least one annular bearing (19) comprising at least one inner annular element integral with said central part, at least one outer annular element concentric with said inner annular element and integral with said peripheral part, and bearing members extending completely around the circumference of the annular bearing and located between said concentric inner and outer annular elements, said peripheral part (12) supporting a contact element (20) for engaging the support surface,
characterised in that said central part (11) is connected by least one suspension arm to the basic structure of the vehicle at at least one peripheral attachment zone (21) of the wheel, this zone being situated adjacent the support surface, in the lower part of the wheel, in that the annular bearing is water-tight and rigid, and in that the central part (11) of this bearing is empty and does not have any diametrical reinforcing structure,
the outer annular element (37) of the bearing (36) is connected to components for coupling this wheel to drive means for driving the vehicle, and
said components for coupling this wheel to the vehicle's drive means comprise a truncated cone shaped structure (32) attached to the outer annular element by at least one hinged rod (33).

11. A wheel as specified in claim 10, characterised in that the cone-shaped structure (32) is made of a lightweight composite material.

12. A wheel for a vehicle designed to travel on a desired support surface, comprising a central part connected to the basic structure of the vehicle and a peripheral part concentric with respect to said central part and rotatable therearound, said central part (11) and said peripheral part (12) are coupled to one another by an annular bearing (19) disposed therebetween, said annular bearing (19) comprising an inner annular element integral with said central part, an outer annular element concentric with said inner annular element and integral with said peripheral part, and rotatable bearing members extending entirely around the circumference of said annular bearing and located between said concentric inner and outer annular elements, said peripheral part (12) supporting a contact element (20) about its exterior perimeter for engaging the support surface,
characterised in that said central part (11) is connected by least one suspension arm to the basic structure of the vehicle at at least one peripheral attachment zone (21) of said central part, said annular bearing is water-tight and rigid, and said central part (11) of this bearing is empty and does not have any diametrical reinforcing structure.

* * * * *